US011770864B2

(12) United States Patent
Goto

(10) Patent No.: US 11,770,864 B2
(45) Date of Patent: Sep. 26, 2023

(54) COMMUNICATION APPARATUS, CONTROL METHOD FOR THE COMMUNICATION APPARATUS, AND STORAGE MEDIUM

(71) Applicant: CANON KABUSHIKI KAISHA, Tokyo (JP)

(72) Inventor: Fumihide Goto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/487,624

(22) Filed: Sep. 28, 2021

(65) Prior Publication Data
US 2022/0015161 A1 Jan. 13, 2022

Related U.S. Application Data

(63) Continuation of application No. 16/290,614, filed on Mar. 1, 2019, now Pat. No. 11,160,121, which is a continuation of application No. PCT/JP2017/030740, filed on Aug. 28, 2017.

(30) Foreign Application Priority Data

Sep. 6, 2016 (JP) ................. 2016-173744

(51) Int. Cl.
H04W 76/10 (2018.01)
H04W 12/50 (2021.01)
G06K 19/06 (2006.01)
H04W 12/06 (2021.01)
H04W 84/12 (2009.01)

(52) U.S. Cl.
CPC ...... *H04W 76/10* (2018.02); *G06K 19/06037* (2013.01); *H04W 12/06* (2013.01); *H04W 12/50* (2021.01); *H04W 84/12* (2013.01)

(58) Field of Classification Search
CPC ..... H04W 76/10; H04W 12/50; H04W 12/06; H04W 84/12; G06K 19/06037
See application file for complete search history.

(56) References Cited

U.S. PATENT DOCUMENTS 9,575,768 B1* 2/2017 Kim ................. G06F 9/4401
11,160,121 B2* 10/2021 Goto ............... G06K 19/06037
2013/0286889 A1* 10/2013 Cherian ............. H04W 76/14
370/254
2015/0229475 A1* 8/2015 Benoit .................. H04L 63/20
713/168

(Continued)

FOREIGN PATENT DOCUMENTS

CN 103916979 A 7/2014
CN 103944870 A 7/2014
CN 105075383 A 11/2015

*Primary Examiner* — Ajay Cattungal
(74) *Attorney, Agent, or Firm* — Canon U.S.A., Inc. IP Division

(57) ABSTRACT

A Connector for establishing a connection to a wireless network in accordance with device provisioning protocol (DPP) and information for establishing a connection to a wireless network in accordance with a protocol different from the DPP are held. In a case where the held Connector is provided to another communication apparatus, information for establishing a connection to a wireless network that is connectable by using the Connector is held, the Connector and the held information are provided to the other communication apparatus in accordance with the DPP.

20 Claims, 7 Drawing Sheets

(56) References Cited

U.S. PATENT DOCUMENTS

| | | | |
|---|---|---|---|
| 2015/0256627 A1* | 9/2015 | Patil | H04L 67/51 |
| | | | 709/228 |
| 2017/0078408 A1* | 3/2017 | Lepp | H04L 67/51 |
| 2017/0295448 A1* | 10/2017 | McCann | H04W 12/04 |

* cited by examiner

COMMUNICATION APPARATUS, CONTROL METHOD FOR THE COMMUNICATION APPARATUS, AND STORAGE MEDIUM

CROSS-REFERENCE TO RELATED APPLICATIONS

This application is a Continuation of U.S. patent application Ser. No. 16/290,614, filed Mar. 1, 2019, which is a Continuation of International Patent Application No. PCT/JP2017/030740, filed Aug. 28, 2017, which claims the benefit of Japanese Patent Application No. 2016-173744, filed Sep. 6, 2016, all of which are hereby incorporated by reference herein in their entirety.

TECHNICAL FIELD

The present invention relates to a communication technique.

BACKGROUND ART

In recent years, the number of cases where a wireless communication function is mounted to electronic devices such as a digital camera, a printer, a mobile phone, and a smart phone, and these devices are used by being connected to a wireless network has been increased.

To connect the electronic device to the wireless network, various communication parameters such as an encryption method, an encryption key, an authentication method, and an authentication key need to be set. As a technique for facilitating the setting of these communication parameters, a setting protocol (Wi-Fi Device Provisioning Protocol, which will be hereinafter referred to as DPP) for communication parameters using a QR code (registered trademark) or the like has been established (NPL 1). In accordance with the DPP, a scheme for performing a secure setting of communication parameters using a public key encryption method and wireless connection processing is regulated.

According to the DPP described in NPL 1, a configurator that provides communication parameters provides information called Connector corresponding to necessary information for establishing a connection to an access point to an enrollee that receives the communication parameters. In addition, the enrollee performs connection processing for generating a key used for an authentication and a communication with the access point by using the Connector provided from the configurator. In addition, according to the DPP of NPL 1, it is stated that the configurator may provide a PSK or a passphrase that is used in related-art connection processing that does not use the DPP to the enrollee.

CITATION LIST

Non Patent Literature

NPL 1 Wi-Fi Alliance, Wi-Fi Device Provisioning Protocol (DPP) DRAFT Technical Specification v0.0.23

A case will be considered where the configurator holds both a Connector for a DPP use and a PSK or a passphrase for a non-DPP use as communication parameters for establishing a connection to a wireless network formed by a certain access point. According to the technique described in NPL 1, there is a fear that the configurator provides only the Connector for the DPP use to the enrollee. In this case, in a case where the enrollee fails in the connection processing using the Connector, a necessity arises that the enrollee obtains the communication parameters again by performing the processing for setting the communication parameters again. That is, it is necessary to perform the processing for setting the communication parameters again to obtain the PSK or the passphrase for the non-DPP use, and there is a fear that it takes time until the connection is established and usability is deteriorated.

SUMMARY OF INVENTION

In view of the above, the present invention aims at providing a technique with which, when a wireless connection to a wireless network is to be established by using the DPP, reduction in time until the connection is established and improvement in usability are realized.

To solve the above-described problem, a communication apparatus according to the present invention is characterized by including first holding means for holding a Connector for establishing a connection to a wireless network in accordance with device provisioning protocol (DPP), second holding means for holding information for establishing a connection to a wireless network in accordance with a protocol different from the DPP, and provision means for, in a case where a first Connector held by the first holding means is provided to another communication apparatus, when the second holding means holds first information for establishing a connection to a wireless network that is connectable by using the first Connector, providing the first Connector and the first information to the other communication apparatus in accordance with the DPP.

In addition, a communication apparatus according to another mode of the present invention includes reception means for receiving a communication parameter for establishing a connection to a wireless network in accordance with device provisioning protocol (DPP), first execution means for executing, in a case where the communication parameter received by the reception means includes a first Connector for establishing a connection to a wireless network in accordance with the DPP and first information for establishing a connection to a wireless network in accordance with a protocol different from the DPP, connection processing according to the DPP using the first Connector before connection processing according to the protocol different from the DPP using the first information is executed, and second execution means for executing the connection processing according to the protocol different from the DPP using the first information in a case where the connection processing by the first execution means is failed.

Further features of the present invention will become apparent from the following description of exemplary embodiments with reference to the attached drawings.

DESCRIPTION OF EMBODIMENTS

Hereinafter, a communication apparatus according to an example of embodiments of the present invention will be described in detail with reference to the drawings. Hereinafter, an example in which a wireless LAN system in conformity to IEEE (The Institute of Electrical and Electronics Engineers, Inc.) 802.11 series is used will be described. However, a communication mode is not necessarily limited to the wireless LAN in conformity to the IEEE802.11.

Figure 3:
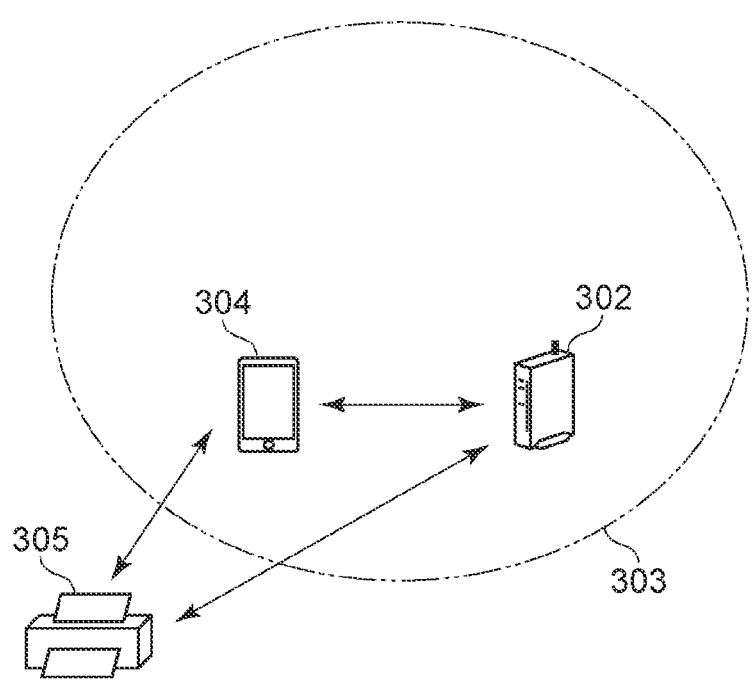
FIG. 3 illustrates an example of a configuration of a communication system.

FIG. 3 illustrates a configuration of a communication system according to the present embodiment. The communication system includes an access point 302, a smart phone 304, a printer 305, and a wireless LAN network 303 (hereinafter, referred to as the network 303). Hereinafter, processing in a case where the printer 305 is caused to participate in the network 303 formed by the access point 302 will be described. The smart phone 304 operates as a configurator regulated by the DPP and provides information to the printer 305 for establishing a connection to the access point 302.

It should be noted that descriptions will be provided while the apparatus in the communication system according to the present embodiment is set as a smart phone, an access point, and a printer, but other apparatuses such as, for example, a mobile phone, a camera, a PC, a video camera, a smart watch, and a PDA may also be used. In addition, the descriptions will be provided while the number of apparatuses in the communication system is set as 3, but 2 or 4 or more apparatuses may also be used.

Figure 1:
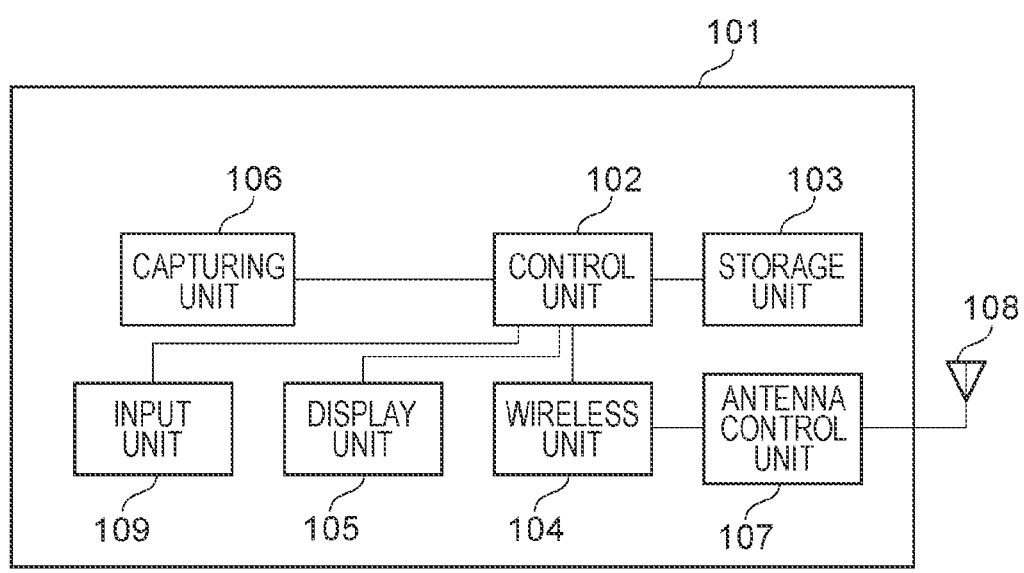
FIG. 1 illustrates a hardware configuration of a communication apparatus.

Subsequently, a hardware configuration in a communication apparatus (the access point 302, the smart phone 304, and the printer 305) of the communication system illustrated in FIG. 3 according to the present embodiment will be described by using FIG. 1. In FIG. 1, 101 denotes an entirety of the apparatus. 102 denotes a control unit that controls the entirety of the apparatus by executing a control program stored in a storage unit 103. The control unit 102 is constituted by a central processing unit (CPU), for example. 103 denotes the storage unit that stores various information such as a control program executed by the control unit 102, image data, and a communication parameter. Various operations which will be described below are performed when the control program stored in the storage unit 103 is executed by the control unit 102. The storage unit 103 is constituted, for example, by a ROM, a RAM, an HDD, a flash memory, a removable SD card, or the like.

104 denotes a wireless unit configured to perform a wireless LAN communication in conformity to IEEE802.11 series. The wireless unit 104 is constituted by a chip that performs a wireless communication. 105 denotes a display unit that performs various displays and has a function with which it is possible to perform an output of visually recognizable information like an LCD or an LED or an output of sound like a speaker. The display unit 105 is provided with the function for outputting at least one of the visual information and the sound information. In a case where the visual information is to be displayed, the display unit 105 includes video RAM (VRAM) that holds image data corresponding to the visual information to be displayed. The display unit 105 performs display control for causing the LCD or the LED to continue displaying the image data stored in the VRAM.

106 denotes a capturing unit that is constituted by an image pickup element, a lens, and the like and performs capturing of a photograph or video. The capturing unit 106 captures an image such as a one-dimensional barcode or a two-dimensional code such as a QR code. 107 denotes an antenna control unit that performs an output control of an antenna 108, and 108 denotes the antenna that can communicate in a 2.4 GHz band and/or a 5 GHz band for communicating by way of the wireless LAN. 109 denotes an input unit with which the user performs various inputs to operate the communication apparatus 101. The input unit 109 stores a flag corresponding to the input in a memory such as the storage unit 103. It should be noted that the example of FIG. 1 is one example, and the communication apparatus may include other hardware configurations. For example, in a case where the communication apparatus is a printer, the communication apparatus may include a printing unit in addition to the configuration illustrated in FIG. 1. On the other hand, in a case where the communication apparatus 101 is the access point 302, the communication apparatus 101 need not include the capturing unit 106 or the display unit 105.

Figure 2:
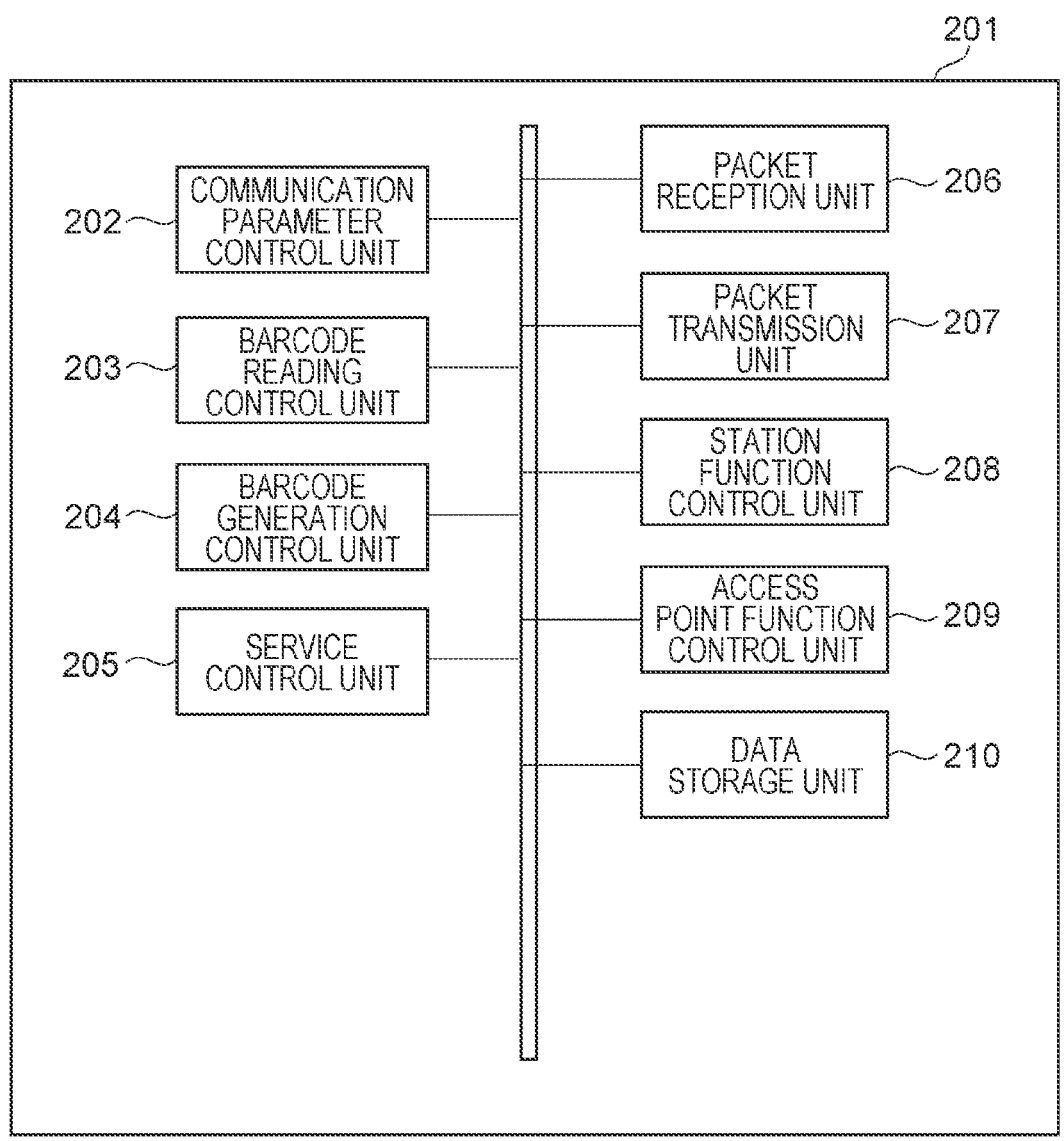
FIG. 2 illustrates a software function configuration of the communication apparatus.

FIG. 2 is a block diagram representing an example of a configuration of a software function block where a communication control function which will be described below is executed. According to the present embodiment, the function blocks of the respective communication apparatuses are stored in the storage unit 103 as programs, and the function is implemented when the program is executed by the control unit 102. The control unit 102 conducts the respective functions by performing control of each hardware and information calculation and process in accordance with the control program. It should be noted that part or all included in the present function block may be put into hardware. In this case, part or all included in the respective function blocks are constituted, for example, by an application specific integrated circuit (ASIC).

In FIG. 2, 201 denotes an entirety of the software function block. 202 denotes a communication parameter control unit. The communication parameter control unit 202 executes communication parameter sharing processing for sharing the communication parameter between the apparatuses. In the communication parameter sharing processing, the provision apparatus provides the communication parameter for establishing the wireless communication to the reception apparatus. Herein, the communication parameters include a service set identifier (SSID) as a network identifier, a wireless communication parameter such as an encryption method, an encryption key, an authentication method, or an authentication key which is necessary to perform a wireless LAN communication. In addition, the communication parameters may also include a Connector regulated by the DPP, a MAC address, a PSK, a passphrase, an IP address for performing a communication on an IP layer, information necessary for a higher-level service. The communication parameter sharing processing executed by the communication parameter control unit 202 is set as the DPP. However, the communication parameter sharing processing executed by the communication parameter control unit 202 may be other processing such as Wi-Fi protected setup (WPS) or Wi-Fi Direct and is not limited to the DPP.

203 denotes a barcode reading control unit. The barcode reading control unit 203 analyzes an image of a one-dimensional barcode, a two-dimensional code such as a QR code, or the like which is captured by the capturing unit 106 and obtains coded information. The barcode reading control unit 203 captures code information by the capturing unit 106 which includes a public key to be used when the communication parameter sharing processing is executed and obtains the captured image. It should be noted that the code information may also be a two-dimensional code such as a CP code or a QR code or a one-dimensional code such as a barcode. The barcode reading control unit 203 analyzes the image of the code information obtained by the capture by the capturing unit 106 and obtains the coded information. According to the present embodiment, the code information may include information used in the communication parameter sharing processing. The information used in the communication parameter sharing processing is information such as a public key used in authentication processing or an identifier of an apparatus. It should be noted that the public key is information used for increasing security at the time of the communication parameter sharing processing and may also be information such as a certificate or a password. Herein, the public key is one type of an encryption key used in a public key encryption method.

204 denotes a barcode generation control unit. Control for generating a one-dimensional barcode, a two-dimensional code such as a QR code, or the like and displaying the generated one-dimensional barcode, two-dimensional code, or the like on the display unit 105 is implemented. The barcode generation control unit 204 generates the code information including information such as the public key used when the communication parameter sharing processing is executed or the identifier of the communication apparatus. 205 denotes a service control unit in an application layer. The application layer herein refers to a service provision layer in a higher-level layer that is higher than or equal to the fifth layer in an OSI reference model. That is, the service control unit 205 executes printing processing, image streaming processing, file transfer processing, or the like by using the wireless communication based on the wireless unit 104.

206 denotes a packet reception unit, and 207 denotes a packet transmission unit, where transmission and reception of any packets including a communication protocol on the higher-level layer are controlled. In addition, the packet reception unit 206 and the packet transmission unit 207 control the wireless unit 104 to perform the transmission and the reception of the packets in conformity to the IEEE802.11 standard with the opposite apparatus.

208 denotes a station function control unit that provides an STA function for operating a station (STA) in an infrastructure mode as specified by the IEEE802.11 standard. The STA function control unit 208 implements authentication/encryption processing or the like when operating as the STA. In addition, 209 denotes an access point function control unit that provides an AP function for operating as an access point (AP) in the infrastructure mode specified by the IEEE802.11 standard. The AP function control unit 209 forms a wireless network and implements authentication/encryption processing with respect to the STA, management of the STA, and the like. 210 denotes a data storage unit that performs control on write and read of the software itself and information such as the communication parameter and a class of barcodes with respect to the storage unit 103. In addition, in a case where the communication apparatus 101 is the access point 302, it is sufficient when the barcode reading control unit 203 and the like do not exist.

An operation of the communication system including the above-described configuration will be described. The access point 302 constitutes the network 303, and the smart phone 304 holds the communication parameter with which a connection can be established to the network 303. As an obtaining method for the communication parameter in the smart phone 304, a related-art protocol such as WPS or AOSS may be used in a case where the access point 302 is not compliant to the DPP. In addition, in a case where the access point 302 is compliant to the DPP, an automatic setting using the DPP or the like may be used. Alternatively, the user may manually input by using the input unit 109.

Figure 4:
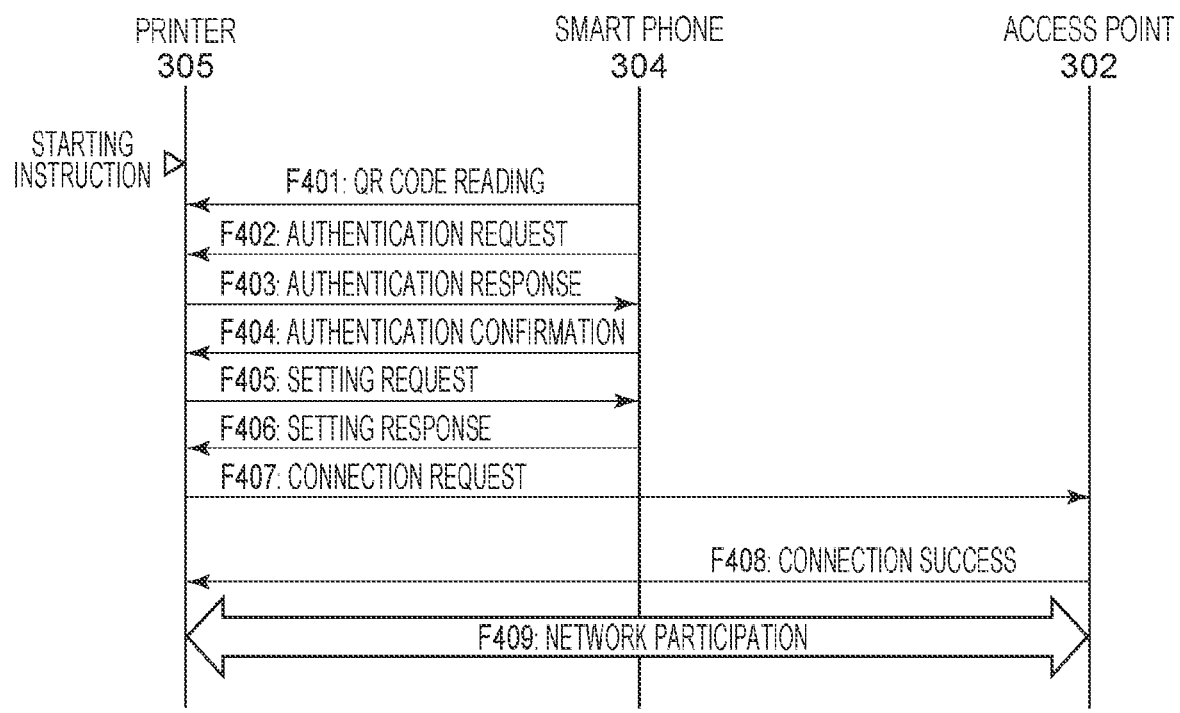
FIG. 4 is an operation sequence diagram between communication apparatuses.

FIG. 4 illustrates a processing operation sequence implemented among the access point 302, the smart phone 304, and the printer 305. The smart phone 304 captures the QR code displayed by the printer 305 that has received a processing starting instruction from the user and obtains authentication information from the QR code (F401). It should be noted that the authentication information obtained in F401 may be a public key. The smart phone 304 generates identification information to be used in authentication processing which will be described below by using the authentication information obtained from the QR code. The smart phone 304 obtains the identification information by calculating a hash value with respect to the public key included in the QR code. After the identification information is calculated, the smart phone 304 transmits an authentication request signal to the printer 305 (F402). The smart phone 304 transmits the authentication request signal including the generated identification information to the printer 305 (F402). The authentication request signal is a signal for requesting the authentication processing. Herein, an Action frame regulated by the 802.11 series is used as the authentication request signal.

When the authentication request signal is received, the printer 305 performs the authentication processing on the basis of the identification information calculated from the public key of the printer 305 and the identification information included in the signal. The printer 305 determines whether or not the identification information included in the received authentication request signal is matched with the calculated identification information. The printer 305 transmits an authentication response signal indicating whether or not the authentication processing is successful. It should be noted that a case where the authentication processing is successful will be described herein. In a case where the identification information included in the received authentication request signal is matched with the calculated identification information, the printer 305 transmits the authentication response signal indicating that the authentication is successful to the smart phone 304 (F403). It should be noted that the authentication response signal is set to include information necessary for executing the authentication processing at a transmission source of the authentication request signal. For example, the authentication response signal includes the identification information calculated at a transmission source of the authentication response signal.

When the authentication response signal is received, the smart phone 304 implements the authentication processing on the basis of the information included in the authentication response signal. The smart phone 304 may also perform the authentication by determining whether or not the identification information included in the received authentication response signal is matched with the identification information generated on the basis of the information obtained from the QR code. In addition, the smart phone 304 generates a common key on the basis of the information included in the authentication response signal or obtains a common key from the authentication response signal.

When the authentication is successful, the smart phone 304 transmits an authentication confirmation signal indicating that the authentication is successful to the printer 305 (F404). When the authentication confirmation signal is received, the printer 305 transmits a setting request signal for requesting the communication parameter to the smart phone 304 (F405). When the setting request signal is received, the smart phone 304 transmits a setting response signal including the communication parameter to the printer 305 (F406). Herein, the communication parameter is communicated in an encrypted state using the common key shared in the authentication processing. It should be noted that the setting response signal may be a DPP Configuration Response frame regulated by the DPP.

Figure 5:
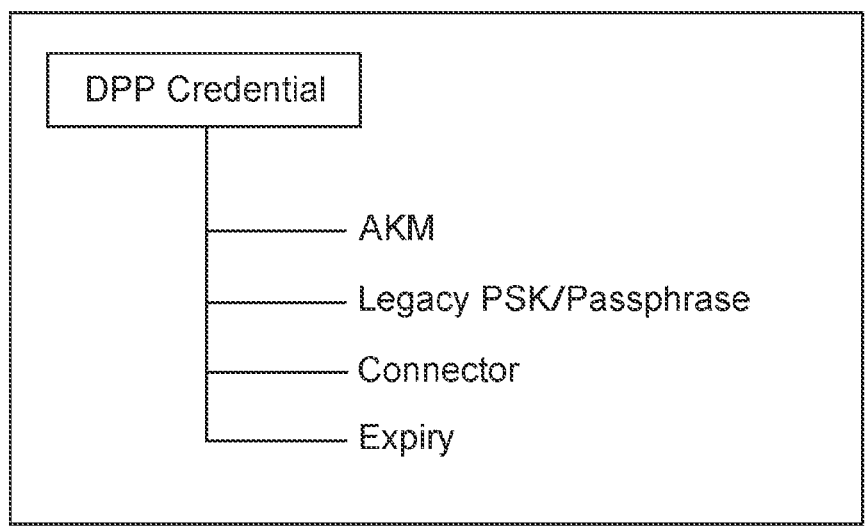
FIG. 5 is a configuration diagram of a communication parameter.

When the DPP is used, the communication parameter transmitted in F406 is as illustrated in FIG. 5 according to NPL 1. AKM, legacy PSK/passphrase, Connector (connector), Expiry (expiry), and the like are set in an entire configuration called DPP Credential. The AKM is an abbreviation of Authentication and key management type and is a value indicating which authentication protocol or key exchange algorithm is to be used at the time of the communication. The legacy PSK/passphrase is an encryption key used when the authentication or key exchange based on the related-art WPA or IEEE802.11 is implemented. That is, the legacy PSK/passphrase is information for establishing a connection to the wireless network formed by the access point in accordance with a protocol different from the DPP. In addition, the Connector is various information used in the authentication protocol and the key exchange algorithm specified by the DPP. The Connector is information for establishing a connection to the wireless network formed by the access point in accordance with the DPP.

When the setting response signal is received, the printer 305 transits a connection request signal with respect to the network 303 to the access point 302 on the basis of the communication parameter included in the setting response signal (F407). It should be noted that, in a case where the received setting response signal includes information indicating that the Connector is valid or a case where the received setting response signal does not include information indicating that the Connector is invalid, the printer 305 transmits the connection request signal in accordance with the DPP to the access point 302.

The connection request signal in accordance with the DPP includes the Connector. The Connector includes at least management apparatus information indicating that the apparatus (configurator) that has provided the communication parameter is the smart phone 304. When the connection request signal is received, the access point 302 compares the management apparatus information in the signal with a management apparatus list stored by itself and conforms whether or not the same apparatus (the smart phone 304) is registered. When it is confirmed that the same apparatus is registered, the access point 302 transmits a connection permission signal for permitting the connection of the printer 305 to the printer 305 (F408). It should be noted that the printer 305 may also include the communication parameter obtained from the smart phone 304 such as the encryption key in the connection request signal. In addition, the access point 302 may confirm whether or not the encryption key included in the connection request signal is matched with the encryption key necessary for the communication in the network 303 and transmit the connection permission signal in a case where the encryption keys are matched with each other.

When the connection permission signal is received, the printer 305 implements necessary connection processing such as 4-Way Handshake with the access point 302 and participates in the network 303 (F409).

Figure 6:
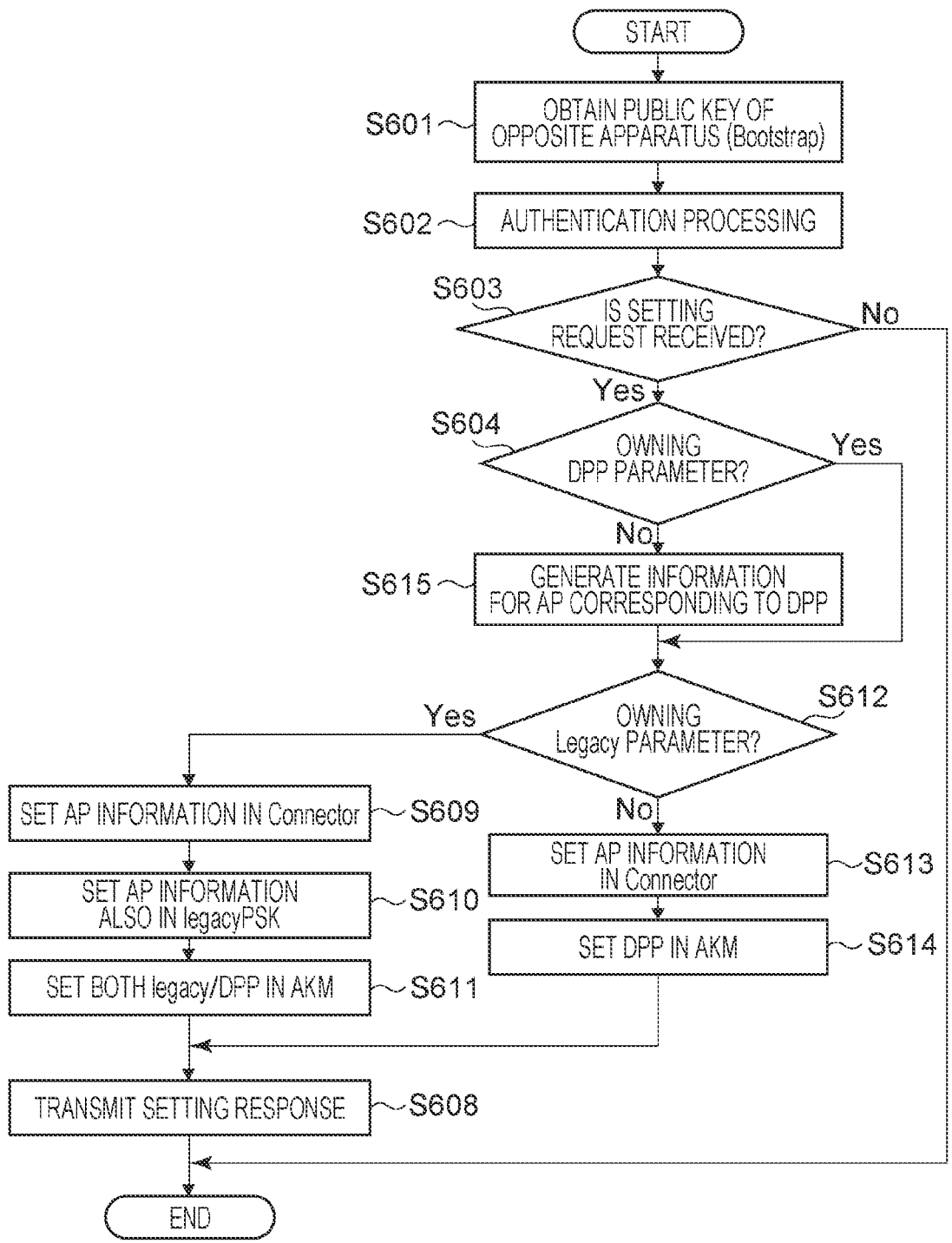
FIG. 6 is a flow chart illustrating a flow of an operation of a communication apparatus parameter provision apparatus.

Next, a processing flow executed in the smart phone 304 will be described by using FIG. 6. FIG. 6 is a flow chart for describing the processing executed in the smart phone 304, and the respective steps of the flow chart are executed when the control unit 102 executes the control program stored in the storage unit 103 of the smart phone 304. It should be noted that a configuration may also be adopted in which part or all of the steps of the flow chart illustrated in FIG. 6 is realized by hardware such as the ASIC, for example.

The flow chart of FIG. 6 is started in a case where the smart phone 304 accepts an instruction for executing the communication parameter sharing processing from the user by the input unit 109. The smart phone 304 obtains the public key corresponding to the authentication information of the printer 305 functioning as the opposite apparatus by the capture of the QR code (F401, S601). It should be noted that a method of obtaining the authentication information is not limited to the QR code alone herein, and another method such as NFC, Bluetooth (registered trademark), USB, or a character string input by the user may also be used. In addition, according to the DPP, the obtainment of the authentication information is regulated under the name of Bootstrap.

Next, the smart phone 304 performs the authentication processing described in F402 to F404 in FIG. 4 (S602). It should be noted that the smart phone 304 ends the processing in a case where the authentication processing is failed. The smart phone 304 determines whether or not the setting request signal is received from the printer 305 in a case where the authentication processing is successful (S603, F405). The smart phone 304 ends the processing in a case where the setting request signal is not received from the printer 305.

When the setting request signal is received from the printer 305, the smart phone 304 determines whether or not the parameter to be provided which is compliant to the DPP is already held (S604). As a result of the determination in S604, in a case where the parameter for the DPP is owned, the processing proceeds to S612.

On the other hand, as a result of the determination in S604, in a case where the parameter for the DPP is not held, since the parameter setting with respect to the access point is not executed, the smart phone 304 newly generates a parameter for the DPP to be held on the memory (S615). It should be noted that the newly generated parameter for the DPP may be a character string generated on the basis of information input by the user or generated randomly.

The smart phone 304 determines whether or not a parameter (referred to as a legacy) which is compliant to WPA or IEEE802.11 for establishing a connection to the wireless network where the connection can be established by the provided parameter for the DPP is held (S612).

As a result of the determination in S612, in a case where the parameter for the legacy is not held, the smart phone 304 sets the parameter information for the DPP as an area where the Connector of the setting response signal to be sent is to be stored (S613). In addition, the smart phone 304 sets a value indicating the DPP in an area where the AKM of the setting response signal to be sent is to be stored (S614).

On the other hand, as a result of the determination in S612, in a case where the communication parameter for the legacy is also owned, the communication parameter for the DPP is set as the area where the Connector of the setting response signal to be sent is to be stored (S609). Furthermore, the smart phone 304 sets the communication parameter for the owned legacy as an area where the legacy PSK/passphrase of the setting response signal to be sent is to be stored (S610). The smart phone 304 sets a value in the AKM which indicates both the legacy and the DPP are owned (S611). The smart phone 304 transmits the setting response signal generated after the processing in S611 or S614 to the printer 305, and the processing is ended (S608, F406).

According to the present embodiment, the Connector information and the legacy information of the DPP Credential illustrated in FIG. 5 set in the setting response signal in F406 transmitted by the smart phone 304 is information for establishing a connection to the same wireless network. With this configuration, the usability can be improved at the provision destination of the communication parameter. For example, in a case where the printer 305 corresponding to the provision destination of the communication parameter fails the connection processing using the Connector, the printer 305 can attempt the connection using the communication parameter for the legacy. Therefore, even when the user saves the effect of capturing the QR code of the printer 305 again by using the smart phone 304 or the like, the printer 305 can attempt the connection again by using the communication parameter for the legacy.

It should be noted that, in a case where the smart phone 304 provides the information for establishing a connection to a plurality of wireless networks to the other apparatus, it is assumed that a setting response signal in which a plurality of DPP Credentials are set is transmitted.

Figure 7:
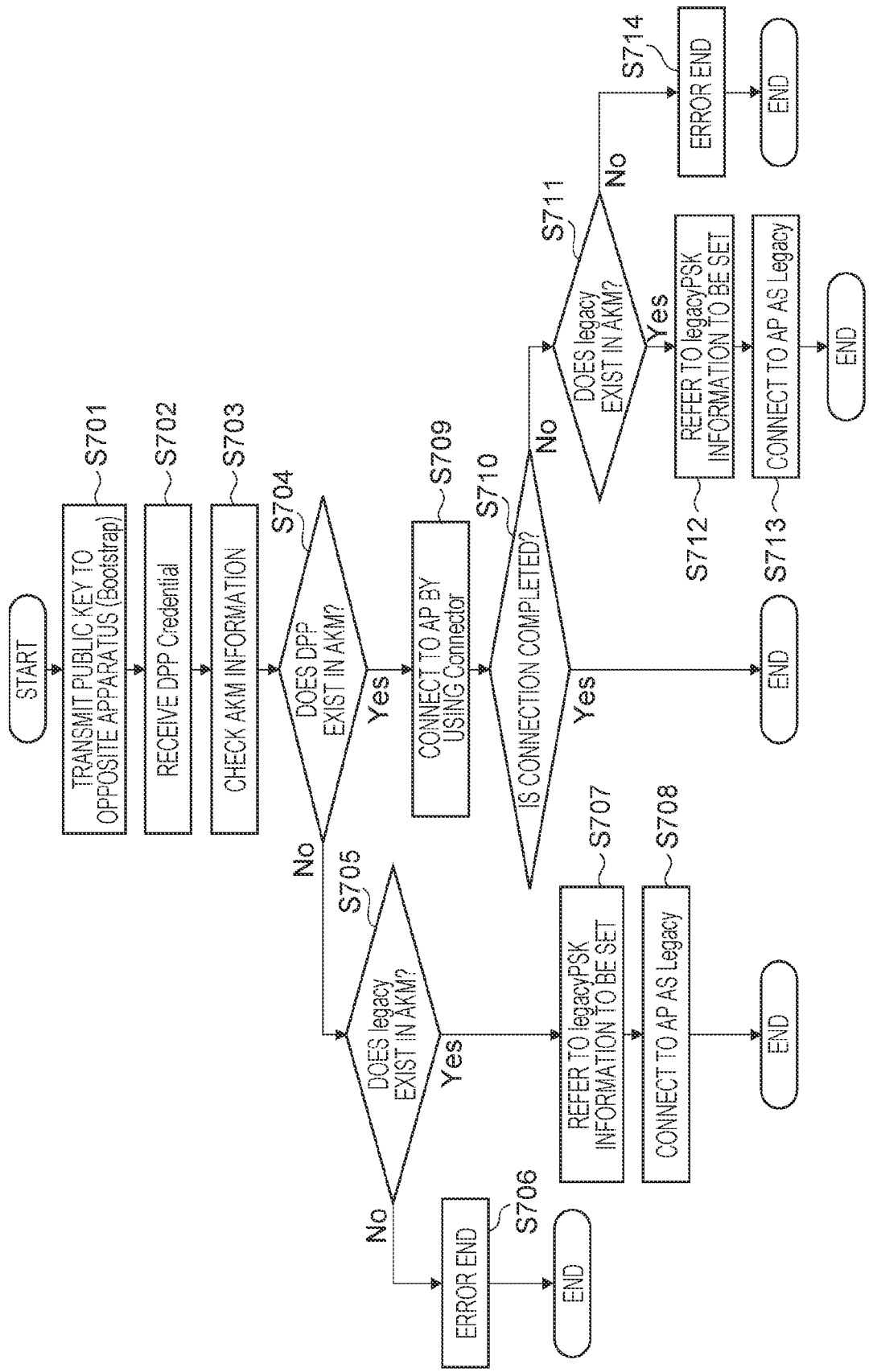
FIG. 7 is a flow chart illustrating a flow of an operation of a communication apparatus parameter reception apparatus.

Subsequently, a processing flow executed in the printer 305 operating as the communication parameter reception apparatus will be described by using FIG. 7. FIG. 7 is a flow chart for describing the processing executed in the printer 305, and the respective steps of the flow chart are executed when the control program stored in the storage unit 103 of the printer 305 is executed by the control unit 102. It should be noted that a configuration may also be adopted in which part or all of the steps of the flow chart illustrated in FIG. 7 is realized by hardware such as the ASIC, for example.

The flow chart of FIG. 7 is started in a case where the printer 305 accepts an instruction for executing the communication parameter sharing processing from the user by the input unit 109. The printer 305 sends the public key corresponding to the authentication information used in the communication parameter sharing processing to the smart phone 304 functioning as the opposite apparatus (F401, S701). It should be noted that, in the descriptions in FIG. 4, the example has been described in which the printer 305 sends the public key, which is a public key corresponding to the authentication information used in the communication parameter sharing processing, by displaying the QR code. However, as a method of sending the public key, the wireless communication such as NFC, Bluetooth, or USB may be used to perform the sending to the opposite apparatus.

Next, the printer 305 performs the authentication processing described in F402 to F404 in FIG. 4 with the opposite apparatus. Then, in a case where the authentication processing is successful, the printer 305 transmits the setting request signal described in F405. Then, the printer 305 receives the DPP Credential corresponding to the communication parameter included in the setting response signal which has been received as a response to the setting request signal (S702).

The printer 305 checks the AKM information from the received the DPP Credential (S703). As mentioned in the descriptions with reference to FIG. 5, the AKM is an abbreviation of Authentication and key management type and is a value indicating which authentication protocol or key exchange algorithm is to be used at the time of the communication. The printer 305 determines whether or not the AKM information includes the value indicating the DPP (S704).

As a result of the determination in S704, in a case where the AKM information does not include the value indicating the DPP, the printer 305 continuously determines whether or not the AKM information includes a value indicating the legacy (S705). As a result of the determination in S705, in a case where the AKM information does not include the value indicating the legacy, the printer 305 subjects the processing to the error end (S706). That is, the sequence in and after F407 in FIG. 4 is not executed, and a notification indicating an error is made on the display unit 105 to end the processing.

On the other hand, as a result of the determination in S705, in a case where the AKM information includes the value indicating the legacy, the printer 305 refers to the legacy PSK/passphrase in the DPP Credential to be set as the encryption key of its own apparatus (S707). Thereafter, the printer 305 performs the connection processing with the access point by using the related-art WPA/WPA2 protocol to implement the communication (S708).

On the other hand, as a result of the determination in S704, in a case where the AKM information includes the value indicating the DPP, a reference is made to the Connector information in the DPP Credential, and the printer 305 attempts the connection processing using the Connector based on the DPP (S709). It is determined whether or not the connection is completed on the basis of the Connector information in the DPP Credential as a result of the attempt of the connection processing in S709 (S710). As a result of the determination in S710, in a case where the connection is normally completed, the processing is ended.

On the other hand, in a case where the connection is not normally completed and the communication with the access point could not be established in S710, the printer 305 checks the AKM information from the received DPP Credential. Then, the printer 305 confirms whether or not the AKM information includes the value indicating the legacy (S711). As a result of the determination in S711, in a case where the information indicating the legacy is not included, the printer 305 subjects the processing to the error end (S714). On the other hand, as a result of the determination in S711, in a case where the AKM information includes the value indicating the legacy, the printer 305 refers to the legacy PSK/passphrase in the DPP Credential to be set as the encryption key of its own apparatus (S712). Thereafter, the printer 305 performs a connection to the access point by using the related-art WPA/WPA2 protocol to establish the communication (S713).

In this manner, in a case where the Connector for the DPP use and the PSK or the passphrase for the non-DPP use are provided by one sequence of the DPP, first, the printer 305 implements the connection processing using the Connector. Therefore, the printer 305 can more securely attempt the establishment of the wireless connection in accordance with the DPP. Then, even in a case where the connection processing of the DPP is failed, the printer 305 can attempt the connection by using the communication parameter for the legacy.

As described above, according to the present embodiment, when the wireless connection to the wireless network is to be established by using the DPP, the reduction in time until the connection is established and the improvement in usability are realized.

OTHER EMBODIMENTS

According to the above-described embodiment, the configuration in which the information for performing the setting of the communication parameter is exchanged between the apparatuses by using the image of the QR code has been described. However, a wireless communication such as NFC or Bluetooth may also be used instead of the capture of the QR code. In addition, a wireless communication such as IEEE 802.11ad or TransferJet (registered trademark) may also be used.

It should be noted that the QR code to be read may be not only the QR code displayed on the display unit but also the QR code affixed to a casing of the communication device in the form of a sticker or the like. In addition, the QR code to be read may be the QR code affixed to an instruction manual or a package such as cardboard at the time of sale of the communication device. In addition, instead of the QR code, a one-dimensional barcode or a two-dimensional barcode other than the QR code may also be used. In addition, information in a format where the user can read may be used instead of the machine-readable information such as the QR code.

In addition, according to the respective embodiments, the case where the communication between the apparatuses is performed by the wireless LAN communication in conformity to IEEE802.11 has been described but is not limited to this. For example, the communication may be implemented by using the wireless communication medium such as wireless USB, Bluetooth, ZigBee, or NFC. Herein, UWB includes wireless USB, wireless 1394, WINET, or the like.

The present invention can also be realized by processing in which a program for realizing one or more functions of the above-described embodiments is supplied to a system or an apparatus via a network or a storage medium, and one or more processors in a computer of the system or the apparatus read out and execute the program. In addition, the present invention can be realized by a circuit that realizes one or more functions (for example, an ASIC).

According to the present invention, it becomes possible to provide the technique with which, when the wireless connection to the access point is to be established by using the DPP, the reduction in time until the connection is established and the improvement in usability are realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:
1. A communication apparatus comprising:
one or more processors; and
one or more memories storing:
a Connector for establishing a connection to a wireless network in accordance with device provisioning protocol (DPP);
information for establishing a connection to a wireless network in accordance with a protocol different from the DPP; and
instructions that, when executed by the one or more processors, cause the communication apparatus to:

accept an instruction for starting a process regarding the DPP from a user; and
provide, in accordance with the DPP, another communication apparatus with a communication parameter including both the Connector and the information.

2. The communication apparatus according to claim 1, wherein the information for establishing a connection to a wireless network in accordance with the protocol different from the DPP is a pre-shared key (PSK) or a passphrase for performing connection processing based on Wi-Fi Protected Access (WPA) or IEEE802.11.

3. The communication apparatus according to claim 1, wherein the information for establishing a connection to a wireless network in accordance with the protocol different from the DPP is obtained by Wi-Fi Protected Setup (WPS), AirStation One-Touch Secure System (AOSS), or an input by a user.

4. The communication apparatus according to claim 1, wherein the instructions, when executed by the one or more processors, further cause the communication apparatus to:
capture an image.

5. The communication apparatus according to claim 4, wherein the communication parameter including both the Connector and the information are provided to the other communication apparatus in a case where an authentication of the other communication apparatus based on authentication information obtained from the captured image is successful.

6. A communication apparatus comprising:
one or more processors; and
one or more memories storing instructions that, when executed by the one or more processors, cause the communication apparatus to:
receive, in accordance with device provisioning protocol (DPP), a communication parameter for establishing a connection to a wireless network; and
execute, in a case where the received communication parameter includes both a Connector for establishing a connection to a wireless network in accordance with the DPP and information for establishing a connection to a wireless network in accordance with a protocol different from the DPP, at least one processing of connection processing according to the DPP using the Connector or connection processing according to the protocol different from the DPP using the information.

7. The communication apparatus according to claim 6, wherein the instructions, when executed by the one or more processors, cause the communication apparatus to:
receive, in accordance with the DPP, the communication parameter including both the Connector and the information.

8. The communication apparatus according to claim 6, wherein the instructions, when executed by the one or more processors, cause the communication apparatus to:
execute the connection processing according to the DPP using the Connector before executing the connection processing according to the protocol different from the DPP using the information; and
execute the connection processing according to the protocol different from the DPP using the information in a case where the connection processing using the Connector is not successful.

9. The communication apparatus according to claim 6, wherein the information for establishing a connection to a wireless network in accordance with the protocol different from the DPP is a pre-shared key (PSK) or a passphrase for performing connection processing based on Wi-Fi Protected Access (WPA) or IEEE802.11.

10. The communication apparatus according to claim 6, wherein a Service Set Identifier (SSID) of the wireless network that is connectable by the Connector and a Service Set Identifier (SSID) of the wireless network that is connectable by the information are identical.

11. The communication apparatus according to claim 6, wherein the instructions, when executed by the one or more processors, further cause the communication apparatus to:
display an image,
wherein in a case where an authentication of another communication apparatus based on authentication information obtained from the displayed image is successful, the communication parameter including both the Connector and the information are received from the other communication apparatus.

12. The communication apparatus according to claim 11, wherein the displayed image is an image illustrating a QR code.

13. The communication apparatus according to claim 6, wherein the instructions, when executed by the one or more processors, further cause the communication apparatus to:
accept an instruction for starting a process regarding the DPP from a user.

14. The communication apparatus according to claim 6, wherein the instructions, when executed by the one or more processors, further cause the communication apparatus to:
print an image.

15. The communication apparatus according to claim 6, wherein the instructions, when executed by the one or more processors, further cause the communication apparatus to:
notify a user of an error in a case where a processing regarding the DPP is not successful.

16. The communication apparatus according to claim 6, wherein the instructions, when executed by the one or more processors, further cause the communication apparatus to:
notify a user of an error in a case where an AKM (Authentication and key management type) compliant with the DPP neither indicates the communication parameter includes a parameter compliant with the DPP nor the communication parameter includes a parameter different from the parameter compliant with the DPP.

17. A control method for a communication apparatus, the control method comprising:
a first holding step of holding a Connector for establishing a connection to a wireless network in accordance with device provisioning protocol (DPP);
a second holding step of holding information for establishing a connection to a wireless network in accordance with a protocol different from the DPP;
an accepting step of accepting an instruction for starting a process regarding the DPP from a user; and
a provision step of providing, in accordance with the DPP, another communication apparatus with a communication parameter including both the Connector and the information.

18. A control method for a communication apparatus, the control method comprising:
a reception step of receiving, in accordance with device provisioning protocol (DPP), a communication parameter for establishing a connection to a wireless network; and
an execution step of executing, in a case where the communication parameter received in the reception step includes both a Connector for establishing a connection to a wireless network in accordance with the DPP and information for establishing a connection to a wireless network in accordance with a protocol different from the DPP, at least one processing of connection processing according to the DPP using the Connector or connection processing according to the protocol different from the DPP using the information.

19. A non-transitory computer-readable storage medium storing instructions that, when executed, cause a communication apparatus to perform a process, the process comprising:
a reception step of receiving, in accordance with device provisioning protocol (DPP), a communication parameter for establishing a connection to a wireless network; and
an execution step of executing, in a case where the communication parameter received in the reception step includes both a Connector for establishing a connection to a wireless network in accordance with the DPP and information for establishing a connection to a wireless network in accordance with a protocol different from the DPP, at least one processing of connection processing according to the DPP using the Connector or connection processing according to the protocol different from the DPP using the information.

20. A non-transitory computer-readable storage medium storing instructions that, when executed, cause a communication apparatus to perform a process, the process comprising:
a first holding step of holding a Connector for establishing a connection to a wireless network in accordance with device provisioning protocol (DPP);
a second holding step of holding information for establishing a connection to a wireless network in accordance with a protocol different from the DPP;
an accepting step of accepting an instruction for starting a process regarding the DPP from a user; and
a provision step of providing, in accordance with the DPP, another communication apparatus with a communication parameter including both the Connector and the information.

* * * * *